United States Patent [19]

Hansen et al.

[11] Patent Number: 4,899,044
[45] Date of Patent: Feb. 6, 1990

[54] OPTICALLY COUPLED REMOTE SENSOR APPARATUS AND SYSTEM

[75] Inventors: J. Richard Hansen, Wilkins, Twp., Allegheny County; Juris A. Asars; Robert M. Oates, both of Murrysville, all of Pa.

[73] Assignee: Westinghouse Electric Corp., Pittsburgh, Pa.

[21] Appl. No.: 188,245

[22] Filed: Apr. 29, 1988

[51] Int. Cl.[4] ............................................. G01D 5/34
[52] U.S. Cl. ................................. 250/227; 250/231 R; 455/612; 73/705
[58] Field of Search ............... 250/227, 231 P, 231 R; 73/705; 307/311; 356/73.1; 455/619, 612, 613, 617

[56] References Cited

U.S. PATENT DOCUMENTS

| | | | |
|---|---|---|---|
| 4,409,476 | 10/1983 | Löfgren et al. | 250/231 R |
| 4,417,140 | 11/1983 | Adolfsson et al. | 250/227 |
| 4,490,606 | 11/1984 | Lockett et al. | 250/227 |
| 4,538,063 | 8/1985 | Bulat | 250/231 P |
| 4,651,571 | 3/1987 | McGlade | 250/227 |
| 4,743,752 | 5/1988 | Olsen et al. | 250/231 R |
| 4,752,141 | 6/1988 | Sun et al. | 250/231 R |

Primary Examiner—David C. Nelms
Assistant Examiner—Stephone B. Allen

[57] ABSTRACT

An optically coupled remote sensor apparatus comprises a tuned circuit incorporating a sensor and a light emitting diode (LED) connected in parallel with the tuned circuit. The natural resonant frequency of the tuned circuit is determined by the sensor whose electrical parameter is a function of the condition to be sensed. The sensed condition correlates to a frequency of light pulses emitted from the LED, which light pulses are only emitted when the pulsed light source frequency coincides with the natural resonant frequency of the tuned circit.

12 Claims, 1 Drawing Sheet

OPTICALLY COUPLED REMOTE SENSOR APPARATUS AND SYSTEM

BACKGROUND OF THE INVENTION

1. Field of the Invention

This invention relates to a remote sensor apparatus and systems and, more particularly, to an improved, electrically isolated remote sensor apparatus which is optically coupled for both electrical power supply and signal transmission, and to a system incorporating same.

2. State of the Relevant Art

It is known to use fiber optic signal conductors, i.e., a fiber optic cable, to achieve electrical isolation of sensors which are required to operate in electrically noisy environments and/or at high voltages, and thereby to avoid the electrical interference which otherwise would be produced if conventional copper wiring were employed as the signal conductor. The most common application involves the use of an optical fiber cable to transmit sensor data from a remote sensor to a central station or control room. Most sensors, however, require electrical power from an external source, which often is not available at the site of the remote sensor. Moreover, to provide the sensor with power through copper or other conventional electrical conductors would defeat the isolation afforded by the fiber optic cable.

A number of solutions to the power problem have been proposed but none so far has proven to be entirely successful. In one, a long life battery is coupled to the sensor. In another, a solar cell is powered by light transmitted through a fiber optic cable.

In yet another, a common light-emitting diode (LED) is used to provide both power and sensor data return; this is desirable, because a common fiber optic cable optically coupled to the LED both powers the sensor and receives the sensor data for return transmission. The LED is operated in a bilateral mode: light is delivered to the LED which, by means of the photovoltaic effect, produces electrical power which is supplied to the sensor unit, which then drives the LED in its normal light-emitting mode. In a specific such embodiment, the LED is driven by a constant light source coupled to it through the fiber optic cable, and the resulting current is used to charge a capacitor. The capacitor energy then is used to power the sensor for a small period of time and to power the LED for emitting light pulses representing the value of the sensor parameter. Even though only extremely small amounts of power can be transmitted in this way, a sufficient quantity of power for the sensor and LED can be achieved by only powering the sensor for a small amount of time and charging the capacitor for most of the time. Implementation has been difficult and complex due to the fact that it requires circuits to switch from the LED to the sensor, control circuits, and data encoding circuits, all of which must be implemented in the remote sensor.

Despite advances made in fiber optic technology, currently available sensors and monitoring systems have failed to satisfy critical needs in the industry. The need for an effective electrical power source for an optically coupled remote sensor is particularly acute in the field of steam turbine power generators, which require a large number of sensors placed at remote sites for accurately detecting critical system operating parameters. There thus exists a continuing need for reliable and effective such sensors and monitoring systems.

SUMMARY OF THE INVENTION

The present invention satisfies the aforementioned need by providing a relatively simple remote sensor apparatus and related system employing a single fiber optic cable which is optically coupled at its respective opposite ends to the remote sensor apparatus and to a central station for both supplying electrical power to the remote sensor apparatus from the central station and for transmitting the sensor data to the central station. The remote sensor apparatus of the invention comprises a tuned circuit incorporating a variable electrical impedance element of a sensor as one element, the electrical impedance value varying as a known function of the condition being sensed and thus, correspondingly, varying the natural resonant frequency of the tuned circuit. An LED is connected in parallel with the tuned circuit and is operative in a bilateral mode, i.e., alternately in a light-receiving mode and in a light-emitting mode. In the receiving mode, the LED is pumped by a pulsed, or chopped, light transmitted through the fiber optic cable from the central station and in a back-biased condition generates an electrical current through its photovoltaic effect, which is stored as electrical energy in the tuned circuit and causes it to "ring" at its resonant frequency. In the backbiased condition of the LED no conduction takes place but, as the tuned circuit continues in its oscillation, the LED becomes forward-biased and draws current from the stored energy in the tuned circuit, causing the LED to emit a short pulse of light which is coupled to the fiber optic cable and transmitted thereby to the central station.

By appropriate adjustment of the amplitude and frequency of the pulsed light coupled to the LED in its receiving mode and of the bias level on the LED, such that the LED conducts only at the positive peak of the resonant sign wave oscillation, any change in the natural resonant frequency of the tuned circuit causes the LED to cease emitting; by readjusting the repetition rate of the light pulses supplied to the LED until emission of output light pulses by the LED is re-established, the new natural resonant frequency of the tuned circuit is determined. Accordingly, by calibrating the sensed parameter values to the corresponding variation of the electrical impedance of the sensor at the corresponding natural resonant frequency to which the tuned circuit is "tuned" by the changes in the sensor electrical impedance, the value of the sensed parameter is correlated to the pulse repetition rate of the LED-emitted light pulses when matched to the repetition rate of the light pulses supplied to the LED in accordance with the above-described adjustment procedure.

The system incorporating the remote sensor apparatus comprises a directional coupler optically coupled to the fiber optic cable, a pulsed light source of variable repetition rate and a photodetector which are individually, optically coupled to the bidirectional coupler and are operative in the alternative, receiving and light emitting modes, respectively, of the LED and a lock-in oscillator and controller. The central station further includes a converter connected to the detector for determining the repetition rate, or frequency, of the received light pulses and a display, the converter being calibrated so as to correlate the sensed parameter value with the received repetition rate and thus to provide a suitable display signal to the display which represents the current value of the sensed parameter.

In operation, light pulses from the pulsed light source, at a selected repetition rate, are directed through the directional coupler and transmitted by the fiber optic cable to the LED of the remote sensor apparatus. The LED then functions through its photovoltaic effect, in its receiving mode, to energize the tuned circuit. In the light emitting mode of the LED, the light pulses emitted by the LED are transmitted through the fiber optic cable and the directional coupler to the photodetector. The photodetector, in the absence of LED-emitted light pulses being received at the central station from the remote sensor, signals the lock-in oscillator and controller to vary the frequency of the light pulses transmitted by the pulsed light source until the frequency matched condition is achieved, at which the lock-in oscillator "locks in" on that frequency.

In a preferred embodiment, the variable impedance element of the sensor may comprise a capacitance which is variable in accordance with the sensed parameter, which may be pressure; alternatively, the variable impedance may comprise a variable inductance which is variable in accordance with pressure or other appropriate parameter to be sensed. In either embodiment, the variable impedance, be it inductance or capacitance, results in a change in the natural resonant frequency of the tuned circuit.

The remote sensor apparatus and system of the invention thus provide for highly effective and efficient energization of an electrically isolated remote sensor from a central station, and for the accurate determination and display of the sensed parameter at the central station, by optical coupling through a single fiber optic cable connected between the central station and the remote sensor. These and other features and advantages of the invention will become more apparent with reference to the following detailed description and drawings.

DETAILED DESCRIPTION OF THE PREFERRED EMBODIMENT

Figure 1:
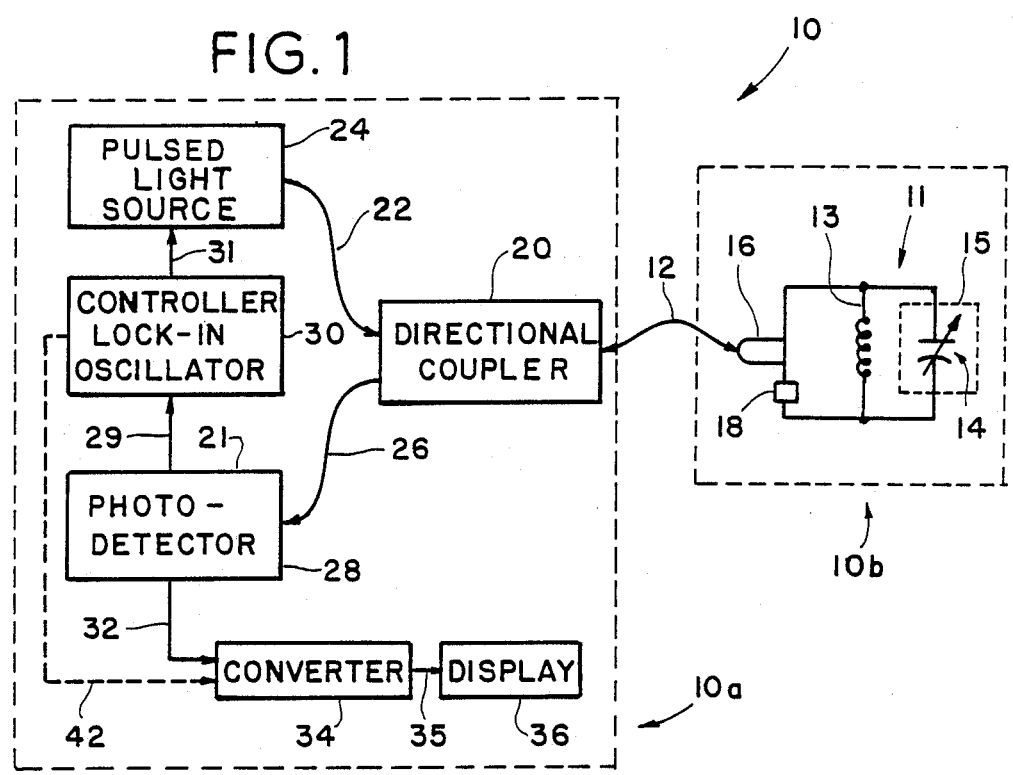
FIG. 1 is a schematic, partially in block diagram form, of the remote sensor apparatus of the invention.

In FIG. 1, the optically coupled remote sensor system 10 of the invention comprises a central station 10a and a remote sensor apparatus 10b, optically coupled by a fiber optics cable 12.

The remote sensor apparatus 10b comprises a tuned circuit 11 of a parallel-connected inductor 13 and variable capacitor 14, and a photodiode, or LED, 16 having a series-connected bias control circuit 18 and which together are connected in parallel with the tuned circuit 11. Variable capacitor 14 is the variable electrical parameter of a sensor 15 which responds to a condition to be sensed, e.g., temperature or pressure, and which varies the capacitance value of capacitor 14 in accordance with changes in the sensed condition. Variations in the value of capacitor 14 correspondingly produce variations in the natural resonant frequency of the tuned circuit 11; as will become apparent, the sensor system 10 of the invention detects the variations in the natural resonant frequency of the tuned circuit 11 to provide a measurement of the sensed condition at the central station 10a.

The central station 10a comprises a directional coupler 20 which is optically coupled to the fiber optic cable 12 for either transmitting power-input light pulses through cable 12 to the remote sensor apparatus 10b or for receiving sensor-output light pulses emitted therefrom and transmitted through the cable 12 to the central station 10a. The directional coupler serves to separate the optical signals connected to the pulsed light source and the photodetector. This same function could be accomplished in other ways including the use of two separate fibers coupled into the same LED 16. The directional coupler 20 further is optically coupled through fiber optics cable 22 to a pulsed light source 24 and through a fiber optics cable 26 to a photodetector 28. The output of the photodetector 28 is supplied over signal line 29 to a controller and lock-in oscillator 30, which supplies an output over signal line 31 to the pulsed light source 24 to control the frequency, or repetition rate, of the power-input light pulses generated thereby. Photodetector 28 furthermore supplies an output corresponding to the sensor-output light pulses received from the remote sensor 10b and detected thereby, over line 32 to a converter 34 which converts the frequency, or repetition rate, of those detected light pulses to a suitable display-control signal supplied over line 35 to a digital display 36.

Figure 2A:
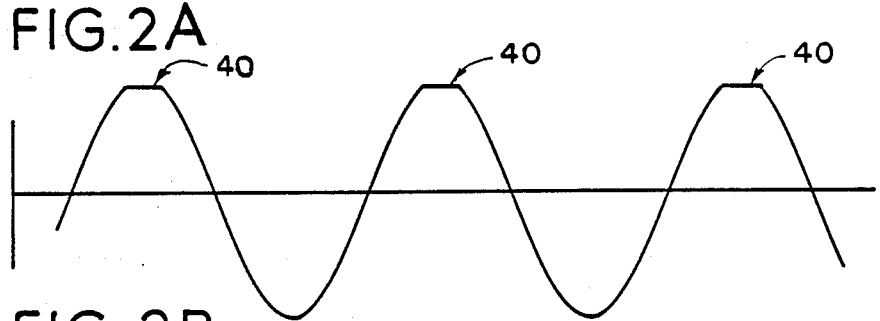
FIG. 2A is a waveform plot of the oscillating voltage of the tuned circuit at a nominal resonant frequency.
Figure 2B:
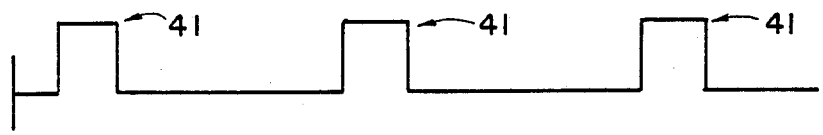
FIGS. 2B and 2C are timing diagrams indicating relative amplitude and timing of the power-input light pulses coupled to the LED and the sensor-output light pulses emitted by the LED, respectively.
Figure 2C:
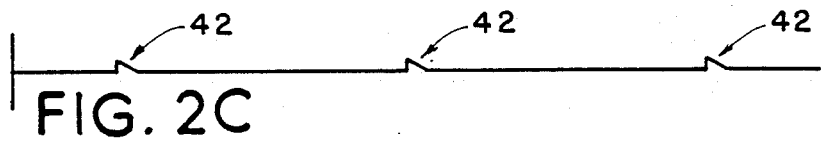

The operation of the optically coupled remote sensor system 10 of the invention will be better understood with reference to the waveforms of FIGS. 2A through 2C, to which concurrent reference is now had. FIG. 2A illustrates the oscillatory, or sinusoidal, waveform of the tuned circuit 11 of the remote sensor apparatus 10b, at some nominal natural resonant frequency determined in accordance with a present value of the variable capacitor 14 of the sensor 15. The tuned circuit 11 is caused to ring at that frequency by energy pulses conveyed as light pulses from the pulsed light source 24 and through cable 22 and directional coupler 20 and the further cable 12 to the remote sensor 10b.

More specifically, the light pulses 41 from pulsed light source 24 are illustrated in FIG. 2B, each light pulse being coupled from cable 12 to the LED 16. LED 16 is maintained in a back- or reversed-biased state by the bias network 18 so as to be nonconductive during the majority of the positive going half-cycle of the sinusoidal oscillation of the tuned circuit 11. The bias level is set such that the LED 16 becomes forward biased at a positive voltage of about 1.6 V. During the time interval of each input light pulse in FIG. 2B, accordingly, the LED 16 functions through the photovoltaic effect in its back-biased condition (negative on anode) to generate a pulse of electrical current which "rings" the tuned circuit 11, generating the sinusoidal waveform of FIG. 2A. As the voltage sinusoid approaches its positive peak—and, specifically, for the illustrative example at about 1.6 V positive in conjunction with the bias circuit 18—the LED 16 becomes forward-biased and draws current from the stored energy in the tuned circuit. This is illustrated by the flattening of the positive peaks of the sinusoid as shown at 40 in FIG. 2A. LED 16 correspondingly fires, or emits, a short pulse of light during this forwardbiased condition, as illustrated by the pulses 42 of FIG. 2C. Those emitted light pulses 42 then are coupled from the sensor 10b through cable 12, and directional coupler 20 and cable 26 to the photodetector 28, as before-described.

As is apparent from the forgoing, the emitted light pulses 42 of FIG. 2C require that the input light pulses of FIG. 2B be of appropriate repetition rate, or frequency, and amplitude so as to permit the LED 16 to generate a sufficient output current and voltage level to produce the requisite ringing of the tuned circuit 11 and sufficient energy storage therein, and whereby the LED 16 is caused to conduct at the positive peaks of the resonant sine wave of FIG. 2A. The controller and lock-in oscillator 30 provides for the necessary control of the pulsed light source 15 to achieve that result.

It follows that in the event the natural resonant frequency of tuned circuit 11 changes because of a change of the electrical parameter, i.e., the capacitance of capacitor 14 of the sensor 15, the LED 16 will cease emitting. Photodetector 28 thus provides no output over line 29 to the lock-in oscillator and controller 30; the latter then readjusts the pulse repetition rate of the control signal applied over line 31 to the pulsed light source 24 and correspondingly the pulse repetition rate of the power-input light pulses to the LED 16 until the sensor-output light signals emitted by the LED 16 are re-established. The resumption of the detected sensor-output signals from photodetector 28 over line 29 thus indicates the requisite match of the repetition rate or frequency of power-output light pulses from source 15 with that of the sensor-output light pulses from the LED 16, to which the controller and lock-in oscillator 30 in turn responds to maintain the newly established repetition rate of the output light pulses. The output from photodetector 28 supplied over line 32 to converter 34 moreover produces a new or adjusted output from the converter 34, which is supplied over line 35 to display 36 for displaying the new value of the sensed parameter. In this regard, it will be understood that the converter 34 is calibrated with regard to correlating the displayed value of the sensed parameter to the pulse repetition rate for the matched condition, i.e., wherein the power-input light pulses are at the appropriate frequency and phase relative to the sensor-emitted light pulses from the LED 16 as detected by the photodetector 28 and thus relative to the current natural resonant frequency of the circuit 11. It thus will be apparent that the controller and lock-in oscillator 30 alternatively may supply the repetition rate information directly to the converter 34, as indicated by the alternative, dashed signal line 42 in FIG. 1.

The present invention accordingly utilizes the bidirectional transmitting capability of the single fiber optic cable 12 and the bilateral operating modes of the photodiode, or LED 16 for purposes of supplying electrical power to the remote sensor 10b from the central station 10a and for transmitting a signal indicative of the condition sensed by the remote sensor 10b to the central station 10a. The requisite isolation of the remote sensor for both power supply and signal transmission thus is achieved in an economic and effective manner.

Numerous modifications and adaptations of the remote sensor apparatus and system of the invention will be apparent to those of skill in the art and thus it is intended by the following claims to cover all such modifications and adaptations which fall within the true spirit and scope of the invention.

We claim as our invention:

1. A sensor apparatus comprising:
    a sensor having an electrical parameter which varies in value in accordance with a condition being sensed;
    a tuned circuit incorporating the electrical parameter of the sensor and generating an oscillatory voltage of a predetermined amplitude and at a natural resonant frequency and corresponding period which is a function of and varies in accordance with variations in the electrical parameter value of the sensor;
    a light emitting diode connected in parallel with the tuned circuit and being operable in both a photovoltaic mode and a light emitting mode; and
    means for biasing the light emitting diode in a back-biased and non-conducting state during a majority of the period of the oscillatory voltage of the tuned circuit, the light emitting diode, when back-biased and exposed to light, generating a photovoltaic current for ringing the tuned circuit and, when forward-biased by the oscillatory voltage, emitting a corresponding sensor-output light pulse.

2. A sensor apparatus as recited in claim 1, wherein the sensor comprises a variable capacitance sensor.

3. A sensor apparatus as recited in claim 1, wherein the sensor comprises a variable inductance sensor.

4. A sensor apparatus as recited in claim 1, further comprising:
    a fiber optic cable optically coupled to the light emitting diode.

5. A sensing apparatus as recited in claim 1, wherein the biasing means comprises:
    a bias control circuit series-connected with the light emitting diode.

6. An optically coupled remote sensor system comprising:
    a central station;
    a remote sensor apparatus; and
    a fiber optics cable optically coupled to each of the remote sensor apparatus and the control station;
    the remote sensor apparatus comprising a sensor having an electrical parameter which varies in value in accordance with a condition being sensed, a tuned circuit incorporating the electrical parameter of the sensor, the tuned circuit generating an oscillatory voltage at a natural resonant frequency which is a function of and varies in accordance with variations in the electrical parameter value of the sensor, a light emitting diode connected in parallel with the tuned circuit and optically coupled to the fiber optics cable and being operable in both a photovoltaic mode and a light emitting mode, and means for biasing the light emitting diode in a back-biased and non-conducting state during a majority of the period of the oscillatory voltage of the tuned circuit;
    the central station further comprising a pulsed light source for generating power-input light pulses, for coupling through the fiber optics cable to the light emitting diode; and
    the light emitting diode, when back-biased and exposed to the power-input light pulses, generating a photovoltaic current for ringing the tuned circuit and, when forward-biased by the oscillatory voltage, emitting a corresponding sensor-output light pulse coupled to the fiber optics cable.

7. An opitcally coupled remote sensor system as recited in claim 6, wherein the sensor comprises a variable capacitance sensor.

8. An optically coupled remote sensor system as recited in claim 6, wherein the sensor comprises a variable inductance sensor.

9. An optically coupled remote sensor system as recited in claim 6, wherein the central station further includes:
a bidirectional coupler optically coupled to the fiber optics cable for transmitting power-input light pulses from the pulsed light source through the fiber optics cable to the light emitting diode and for receiving the sensor-output light pulses transmitted through and coupled from the fiber optics cable.

10. An optically coupled remote sensor system as recited in claim 9, wherein the central station further includes:
a photodetector, optically coupled to the bidirectional coupler, for detecting the sensor-output light pulses and producing a corresponding output signal representing the frequency of the received sensor-output light pulses.

11. An optically coupled remote sensor system as recited in claim 10, wherein the central station further includes:
a controller and lock-in oscillator, operable in response to the absence of the photodetector output signal, to output a frequency control signal for varying the frequency of the power input light pulses generated by the pulsed light source.

12. An optically coupled remote sensor system as recited in claim 11, wherein the central station further includes:
a converter for converting the output signal of the photodetector corresponding to the frequency of the sensor-output light pulses received from the remote sensor and detected thereby, to a display-control signal representative of the value of the sensed condition; and
a display, operable in response to the display-control signal, for displaying the value of the sensed condition.

* * * * *